US008149406B2

(12) United States Patent
Bergman et al.

(10) Patent No.: US 8,149,406 B2
(45) Date of Patent: Apr. 3, 2012

(54) METHOD OF CONTROLLING THE COLOUR OF THE LIGHT OUTPUT OF A LAMP

(75) Inventors: Anthonie Hendrik Bergman, Nuenen (NL); Steven Ferdinand Kleijer, Rijswijk (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 414 days.

(21) Appl. No.: 12/439,809

(22) PCT Filed: Sep. 18, 2007

(86) PCT No.: PCT/IB2007/053759
§ 371 (c)(1),
(2), (4) Date: Aug. 14, 2009

(87) PCT Pub. No.: WO2008/038180
PCT Pub. Date: Apr. 3, 2008

(65) Prior Publication Data

US 2009/0309513 A1 Dec. 17, 2009

(30) Foreign Application Priority Data

Sep. 28, 2006 (EP) .................................... 06121443

(51) Int. Cl.
*G01J 3/46* (2006.01)
*G01N 21/25* (2006.01)

(52) U.S. Cl. ......................... 356/402; 356/407; 356/425

(58) Field of Classification Search ....................... None
See application file for complete search history.

(56) References Cited

U.S. PATENT DOCUMENTS

| | | | | |
|---|---|---|---|---|
| 5,418,432 | A | 5/1995 | Takeuchi et al. | |
| 6,798,517 | B2 | 9/2004 | Wagner et al. | |
| 6,894,442 | B1 | 5/2005 | Lim et al. | |
| 7,026,769 | B2 | 4/2006 | Lee et al. | |
| 2003/0107888 | A1 | 6/2003 | Devlin et al. | |
| 2005/0030538 | A1 | 2/2005 | Jaffar et al. | |
| 2006/0018535 | A1 | 1/2006 | Oon et al. | |
| 2006/0158881 | A1 * | 7/2006 | Dowling | 362/231 |

* cited by examiner

FOREIGN PATENT DOCUMENTS

| | | | |
|---|---|---|---|
| WO | 03078894 | A1 | 9/2003 |
| WO | 2006052047 | A1 | 5/2006 |

*Primary Examiner* — Douglas W Owens
*Assistant Examiner* — Dedei K Hammond

(57) ABSTRACT

The invention describes a method of controlling the color of the light output of a lamp (1), which method comprises electronically collecting color data pertaining to a first color ($C_1$) to obtain a first color description ($D_1$), electronically collecting color data pertaining to a second color ($C_2$) to obtain a second color description ($D_2$), and combining the first color description ($D_1$) with the second color description ($D_2$) to obtain a target color description ($D_T$). The target color description ($D_T$) is transferred to a control unit (4) of the lamp (1), and the lamp (1) is driven according to the target color description ($D_T$) to give a target color light output. The invention also relates to a system (3) for controlling the color of the light output of a lamp. Furthermore, the invention relates to a color data collection device (2) for use in a system (3) for controlling the color of the light output of a lamp (1), which color data collection device (2) comprises a color detector (20) for electronically converting captured light ($L_r$, $L_{sp}$) into color data pertaining to a color ($C_1$, $C_2$), a conversion unit (21) for translating the color data pertaining to a color ($C_1$, $C_2$) into a corresponding color description ($D_1$, $D_2$), a combining unit (22) for combining a first color description ($D_1$) with a second color description ($D_2$) to obtain a target color description ($D_T$), and a transfer interface (23) for transferring the target color description ($D_T$) to a control unit (4) of the lamp (1).

13 Claims, 4 Drawing Sheets

METHOD OF CONTROLLING THE COLOUR OF THE LIGHT OUTPUT OF A LAMP

Figure 1:
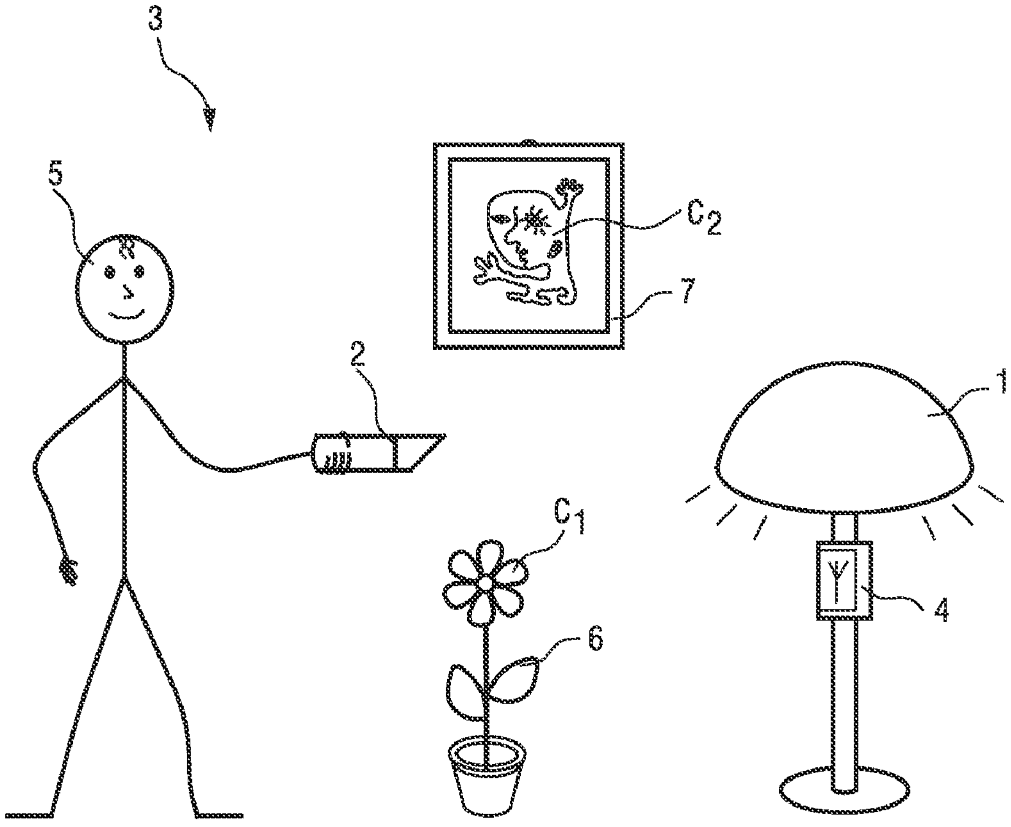

This application is a national stage application under 35 U.S.C. §371 of International Application No. PCT/IB2007/053759 filed on Sep. 18, 2007, which claims priority to European Application No. 06121443.3, filed on Sep. 28, 2006, incorporated herein by reference.

The invention relates to a method of controlling the colour of the light output of a lamp, and to a system for controlling the colour of the light output of a lamp. The invention further relates to a colour data collection device for use in a system for controlling the colour of the light output of a lamp State of the art light sources or lamps are generally limited to outputting light of a single colour. The light output of some lamps can be increased or decreased by means of a dimmer, but apart from this limited means of controlling the light output, a user can only either turn the light on or off. This is set to change, since light sources capable of producing the whole spectrum of coloured light will become commonplace in the near future. Such lamps can, for example, comprise an arrangement of light-emitting diodes (LEDs) that can emit light at different wavelengths, or can comprise a source of white light which can be altered by means of differently coloured moveable filters. With these type of lamps, almost any colour or atmosphere can be created, so that the lighting can be adapted to suit the room, whether it be in a home or commercial environment. For example, a gentle light in a colour to promote relaxation can be chosen for the living room of a home in the evening, in a colour to complement the furnishings. In a boutique, the colour of the lighting can be changed to suit the current fashion collection, so that the products in the shop are presented in a more attractive way to the customer.

A remote control colour device for 'picking' or choosing a colour to be transferred to a lamp is described in PCT/IB 2006/052047. This is a device with which a user can choose a colour by placing the device on an object of the colour to have transferred to the lamp, which will then output the light of the chosen colour. For example, the lighting in a shop can be 'tuned' to a fashion shade by using the remote control colour device to pick one of the fashion shades. The device, shaped like a pen and also called a 'colour picker' or 'light wand', is equipped with a light sensor or detector for electronically registering incoming light, and a module for converting the resulting electrical signals into a value corresponding to the wavelength of the light, and some means of transferring this value to a lamp when a 'paste' button is pressed. However, this device is limited to choosing a single colour. For a situation in which a particular colour is desired, but that particular colour is not available, for example when there is no object of that colour in the surroundings, the state of the art remote control colour device will not be able to 'pick' that colour, and the lamp will not be able to be controlled to output that colour.

Therefore, it is an object of the invention to provide an uncomplicated and intuitive way of specifying any desired colour for a lamp.

To this end, the present invention provides a method of controlling the colour of the light output of a lamp, which method comprises electronically 'copying' or collecting colour data pertaining to a first colour to obtain a first colour description, electronically 'copying' or collecting colour data pertaining to a second colour to obtain a second colour description, and combining the first colour description with the second colour description to obtain a target colour description. The target colour description is then transferred, or 'pasted', to a control unit of the lamp, and the lamp is driven according to the target colour description to give a target colour light output.

An obvious advantage of the method according to the invention is that essentially any desired colour can be obtained, using available colours, so that a user of the colour data collection device is not restricted to using a limited set of predefined colours. Evidently, the invention is not limited to only combining two colours. A previously combined colour can act as a first colour to which a further colour is added. This process can be repeated until a satisfactory shade is obtained. A further advantage of the invention is the intuitive 'copy/paste' approach. Colours are simply 'copied', and, once the target colour has been obtained, this is simply 'pasted' to a lamp.

An appropriate system for controlling the colour of the light output of a lamp comprises a colour data collection device for collecting colour data pertaining to a first colour to obtain a first colour description and for collecting colour data pertaining to a second colour to obtain a second colour description. The system further comprises a combining unit for combining the first colour description with the second colour description to obtain a target colour description, and a control unit of the lamp for driving the lamp according to the target colour description. The combining unit can be realised as part of the lamp, or externally to the lamp, for example the combining unit can be realised directly in the colour data collection device. Evidently, some means of transferring relevant information—first and second colour descriptions from the colour data collection device to the combining unit and/or a target colour description from the combining unit to the control unit—should be included in the system realisation.

Such a colour data collection device, for use in a system for controlling the colour of the light output of a lamp, comprises a colour detector for electronically converting captured light into colour data pertaining to a colour, a conversion unit for translating the colour data pertaining to a colour into a corresponding colour description, a combining unit for combining a first colour description with a second colour description to obtain a target colour description, and a transfer interface for transferring the target colour description to a control unit of the lamp.

The dependent claims and the subsequent description disclose particularly advantageous embodiments and features of the invention.

The colour detector of the colour data collection device can comprise a number of sensors such as a charge-coupled device (CCD) or an array of photodiodes or phototransistors, and responds to incident light to produce colour data in the form of one or more electrical outputs according to the wavelength and intensity of the incident light. Such colour data can represent the incoming light in electrical terms, for instance in terms of volts, amps, or farads. The electrical output of the colour detector—the colour data—is then directly related to the wavelength and intensity of the incident light. PCT/IB 2006/052047 outlines the mode of operation of the state-of-the-art remote control colour device for 'picking' or choosing a colour to be transferred to a lamp. The relevant technologies will be known to a person skilled in the art, and need not be explained in detail here.

In a preferred physical realisation of the colour data collection device, the colour data collection device can be a pen-shaped hand-held portable device comprising a chamber in the tip of the device, open at the front end, and with a colour detector positioned in a recess of the chamber, so that light entering the chamber can be collected by the colour detector.

In the following, it is assumed that the colour data collection device is realised in this way, without however excluding the possibility of any other practicable realisation of the colour data collection device.

To ‘collect’ colour data, the colour data collection device is directed at a colour, so that light reflected off that colour will impinge upon the colour detector in the colour data collection device. In a preferred embodiment of the invention, the step of obtaining a colour description pertaining to a colour comprises directing the colour data collection device at the colour, capturing light originating from that colour with the colour data collection device, electronically converting the captured light into colour data, and translating the colour data into a colour description. The term ‘directing at a colour’ is used for simplicity, and means that the colour data collection device is aimed or directed at an object of that colour, or at the colour emanating from a light source. A ‘colour’ need not be a single colour, but can also be a pattern or an arrangement of different colours.

The wavelength of visible light determines the colour perceived by the human eye. The perceived colour of an object is determined by the wavelengths in the light leaving the surface of the object, regardless of whether the object itself emits light or simply reflects light. Since red, blue and green light can be combined to give light of any colour, a colour can be described by its red, blue and green components. Such descriptions are commonly used and are often referred to as RGB values. Basically, an RGB value comprises three values for relative strengths or intensities of the red, blue and green components of a colour. For example, an RGB value for an incident beam of light can comprise a value corresponding to the red light component, a value corresponding to the green component, and a value corresponding to the blue component. In an RGB representation of pure red light, for example, the values for yellow and blue components are zero, and the intensity of the red light is determined by the value of the red component. For a pure yellow light, the blue component is zero, and the relative strengths of the red and green components will give a measure of the ‘yellowness’ and the intensity of the resulting yellow light. Any shade of light can be described or produced by appropriate choice of the red, green and blue components of its RGB value. A number of different standards exist for describing light in this manner, and, since these will be familiar to a person skilled in the art, they need not be described in more detail here.

The conversion unit of the colour data collection device can convert or translate the collected colour data to a colour description, such as an RGB value as described above. A first colour description collected for a first colour can be stored in a memory of the colour data collection device. When colour data pertaining to a second colour are collected, a combining unit of the colour data collection device can combine the first colour description with the second colour description to obtain a target colour description. Preferably, a target colour description is obtained by gradually modifying the one of the colour descriptions to approach the other colour description, so that any shade between the first and second colour descriptions can be obtained. For example, the combined colour can be obtained by slowly changing from the first colour to the second colour, so that any shade between these two colours can be obtained. The term ‘slowly’ is used to indicate that the gradual changing process can be perceived by the user, so that the user can interrupt or terminate the combination to select the desired colour. For example, a slightly reddish white can be obtained by collecting or ‘copying’ a first white colour, and then collecting a second red colour to be gradually copied into the white colour. When a user is satisfied with the ‘redness’ of the colour, he can interrupt the gradual copy process. Alternatively, the RGB values of two colours can be combined by essentially adding the appropriate red, blue and green components together to give a combined RGB value.

When aiming the colour data collection device at an object, from a distance, light entering the colour data collection device will consist of light reflected off the object at which the colour data collection device is being aimed, as well as spurious or ambient light originating from other sources. This spurious light can have an unwanted influence if it is only the colour of the object that is the desired colour. Therefore, in a first alternative, the step of obtaining a colour description pertaining to a colour preferably comprises placing the colour data collection device firmly upon the surface of the object whose colour is to be collected so that no other light can enter the front part or chamber of the colour data collection device, and directing light at the colour from a light source such as a white LED, located in the chamber of the colour data collection device. While maintaining this close contact between the colour data collection device and the colour, any reflected light can be collected by the colour detector of the colour data collection device and analysed to obtain the colour description, while other spurious or ambient light is excluded from the chamber and will not influence the collected colour data.

A first and second colour description pertaining to a first and second colour respectively can be obtained sequentially using this approach. In this way, the first and second colour descriptions are obtained independently of one another. However, it is also possible using the method of the invention to obtain a first colour description and a second colour description simultaneously. This alternative makes use of the fact that ambient or spurious light will influence the appearance of the light reflected off a colour. Therefore, in a further embodiment of the invention, the step of obtaining a colour description pertaining to the second colour comprises tilting the colour data collection device away from the first colour, permitting spurious light to enter the colour data collection device, and combining this with the first colour description to obtain the second colour description. For instance, the user might want to change the light output of a lamp to a “pale green”, but might only avail of a bright green colour. In this case, the user simply places the colour data collection device firmly upon the green colour to collect this first, and then tilts the front part of the colour data collection device away from the green colour to allow ambient light to enter the chamber, thereby causing the bright green shade to be altered or fine-tuned to a “pale” shade. Another way of collecting colours simultaneously is to place the colour data collection device on a surface with regions of different colours, for example a colour sample sheet. If the user wishes to obtain a colour between two or more adjacent colours on the colour sheet, he need only position the colour data collection device on the sheet so that parts of the selected colours are covered by the chamber of the colour data collection device. The colours are simultaneously ‘collected’, and the user can terminate the copy process when the desired shade has been obtained.

Evidently, it is advantageous for the user to be able to determine when the colour collection process can be stopped, i.e., for the user to see when the collected colour is satisfactory. Therefore, in a particularly preferred embodiment of the invention, a colour description is visually presented to a user on a suitable output means or visual presentation unit. The colour description rendered to the user can depend on the operation currently being carried out by the user. For example, when collecting a first colour, the colour rendered in the visual presentation can correspond to the colour description of the first colour. When collecting a second colour, the colour shown in the visual presentation unit can be the momentary results of a 'gradual copy' procedure. The visual presentation unit could be realised in a number of ways. For instance, the results of a gradual copy procedure can be continually transferred from the colour data collection device directly to the lamp, so that the lamp changes its colour output accordingly. When the light output of the lamp is satisfactory to the user, he can terminate the copy process. In this example, the lamp itself acts as the visual presentation unit. On the other hand, it may be advantageous not to restrict the colour data collection device to use in the immediate vicinity of the lamp. For example, a user of a colour data collection device might like to collect colours elsewhere, such as at a friend's house. Therefore, in a particularly preferred embodiment of the invention, the visual presentation unit is realised on the colour data collection device. Naturally, the accuracy of the colour shown to the user in such a visual presentation unit will depend on the accuracy of the colour detector and on the physical realisation of the output means. For example, an output means comprising an arrangement of white and different coloured LEDs can render a gamut of colours corresponding to the number of LEDs.

The colour description could also be directly shown to the user in a suitable display, for example the RGB value of a colour description could be shown as three values on a liquid crystal display (LCD) on the colour data collection device. Naturally, both approaches to feedback could be used, so that the visual presentation unit of a colour data collection device comprises a colour output as well as an LCD display. However, since a colour output is generally the more intuitive from the user's point of view, visual presentation is preferably rendered in the form of a colour output.

In a preferred embodiment of the invention, collection of colour data is controlled by the user according to the visual presentation of a colour corresponding to a colour description. The user can observe the shade of the colour (or the RGB values of a colour in a display) being shown in the visual presentation, and can terminate the colour data collection process at the moment where the shade of the shown colour is satisfactory. In one scenario, the user can place the colour data collection device upon an object of a desired first colour, in close contact with the surface of the object, and can commence 'collecting' that first colour. When the intensity of the colour shown in the visual presentation is satisfactory to the user, he can terminate the collection process for the first colour. In a following step, the user can place the colour data collection device on an object of a second colour and again initiate the collection process. The second colour being gradually combined with the first colour is rendered in the visual presentation unit. When the user is satisfied with the appearance of the combined colours, he can terminate the collection process. In another scenario, after collecting the first colour as described above, the user can simply tilt the colour data collection device away from the first colour and again commence collecting colour data. This time, the spurious light entering the colour data collection device is the "second colour", and this, combined with the first colour, is shown to the user in the visual presentation. Again, when the result of the colour mixing is satisfactory to the user, he can terminate the collection process. As mentioned already, the process of collecting colour data until a satisfactory colour mix is obtained can be repeated indefinitely. Each time, the previously collected or combined colour is taken to be the "first" colour, and the new colour being collected is taken to be the "second" colour. If the user finds that he has copied too much of the second colour, he can simply correct or fine-tune the combined colour by copying some of the first colour again.

To commence and terminate colour data collection, a number of buttons can be used on the colour data collection device, such as a "start copy" button and a "stop copy" button. Alternatively, a single button can be used, for example, the user can depress a "collect" button on the colour data collection device to initiate colour data collection, observe the ensuing colour in the visual presentation, and release the "collect" button at the appropriate moment to terminate collection. It is also conceivable that other types of sensors could be used by the colour data collection device to determine when the user is actively collecting a colour or has decided to terminate collection. For example, a pressure sensor could be used to determine whether the colour data collection device is being placed on an object to collect its colour, or a motion detector could be used to determine if the colour data collection device is being lifted away from an object.

The target colour description can be sent to a control unit of a lamp in the form of an RGB value, or it can be converted prior to transmission into a form directly useable by the control unit. For example, for a lamp comprising a plurality of different coloured LEDs, the target colour description can be converted into control signals for the relevant LEDs, so that only the required LEDs will be activated to give the target colour. For a lamp that generates different colours by combining coloured filters in certain ways, the target colour description can be converted into the commands necessary to move the filters into the position necessary for producing the target colour. Of course, such a conversion step can equally well be carried out in the control unit of the lamp. Transfer of the target colour description can be effected, for example, by the user aiming the colour data collection device in the direction of a control unit, and pressing a 'paste' button.

To transfer the target colour description to the lamp, the colour data collection device is preferably equipped with a suitable transmitter module. For example, the target colour description can be transmitted in a wireless manner to a control unit of a lamp. The wireless mode of transmission can be chosen in accordance with the range requirements of the system. For example, short range transmission in a domestic environment can be effected with a low-strength signal, while transmission over a greater distance, such as in a theatre or exhibition hall, might require signals of higher energy. The signal being transmitted to a control unit of a lamp may be bundled, or focussed, so that preferably only a single lamp control unit receives the signal, or it may be scattered, so that the signal can be detected by a plurality of lamp control units. It is also conceivable that a lamp for use in a constellation of lamps is assigned to a particular ID, and that the user can in some way specify the lamp that is to receive the target colour description by means of the lamp's ID. The choice of signal transfer mode will be apparent to a person skilled in the art. To assist the user in aiming the colour data collection device in the direction of the control unit of the lamp, the colour data collection device can be equipped with a laser light source to provide a beam of laser light in the direction of pointing, in the manner of a laser pointer. In this way, the user can easily adjust his aim so that the control unit can receive the target colour description.

Other objects and features of the present invention will become apparent from the following detailed descriptions of exemplary embodiments considered in conjunction with the accompanying drawing. It is to be understood, however, that the drawings are designed solely for the purposes of illustration and not as a definition of the limits of the invention.

FIG. 1 shows a schematic diagram of a system for controlling the colour of the light output of a lamp according to an embodiment of the invention.

Figure 2A:
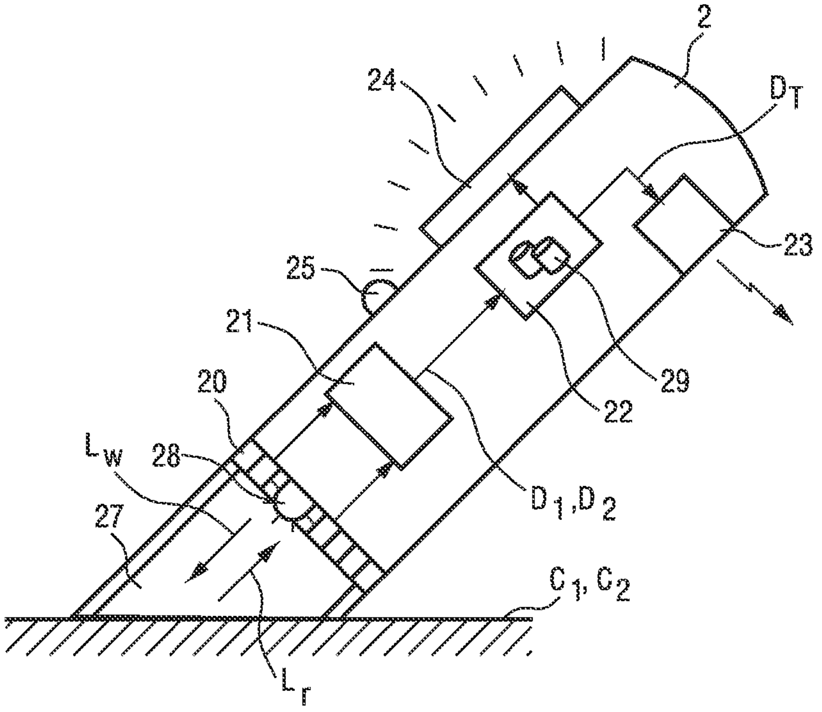

FIG. 2*a* shows a colour data collection device according to an embodiment of the invention.

Figure 2B:
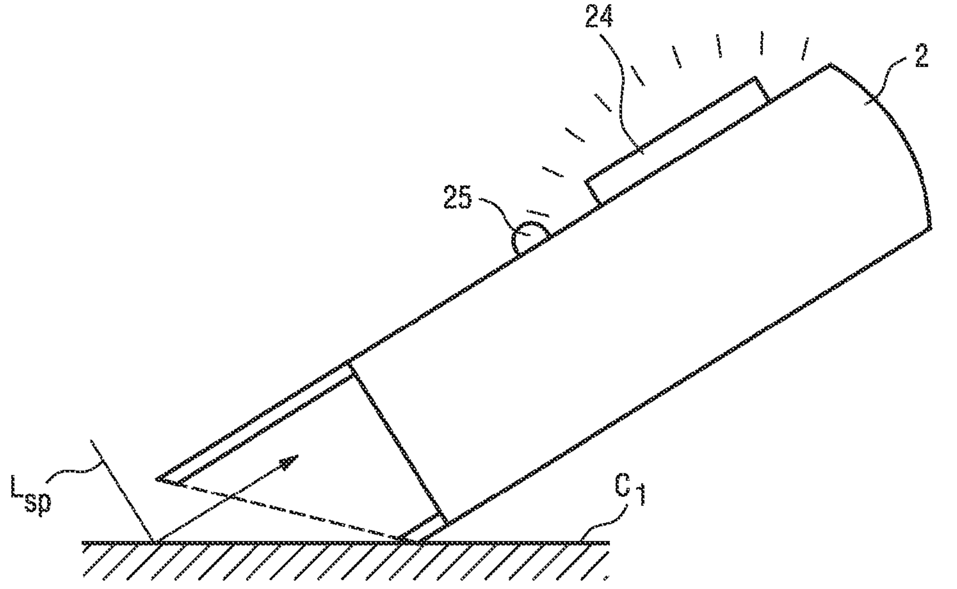

FIG. 2*b* shows the colour data collection device of FIG. 2*a* in a tilted position.

Figure 3A:
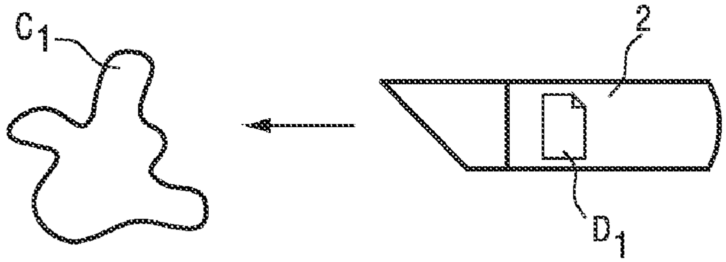
Figure 3B:
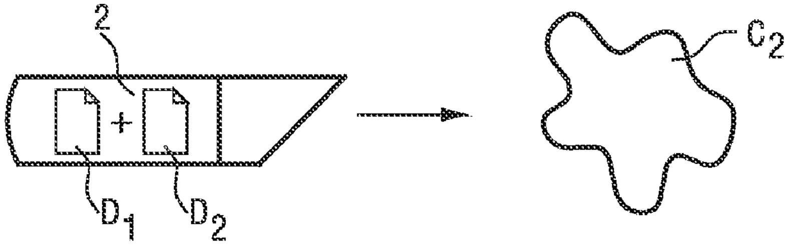
Figure 3C:
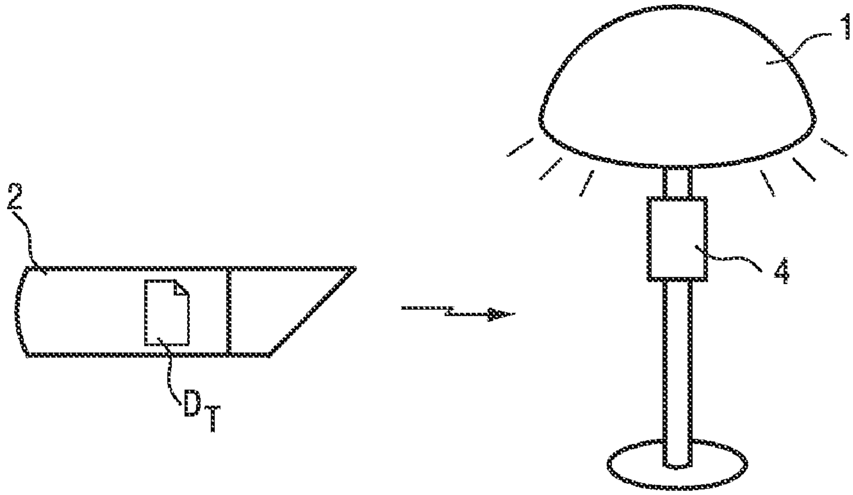

FIGS. 3*a*-3*c* schematically show the steps of obtaining a target colour description for transferring to a lamp.

Figure 4:
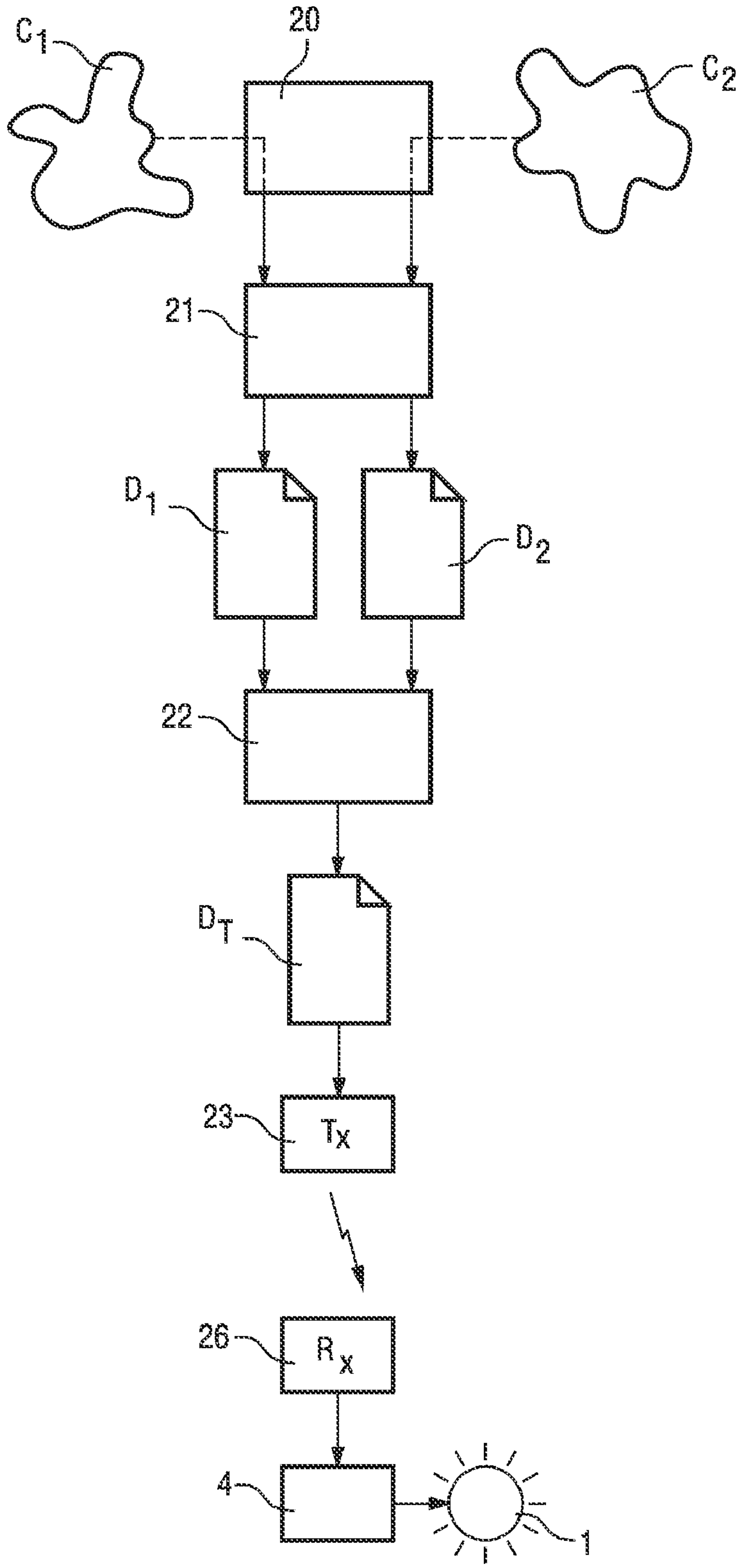

FIG. 4 shows a block diagram of the steps of obtaining a target colour description for transferring to a lamp.

In the diagrams, like numbers refer to like objects throughout. For the sake of clarity, objects in the diagrams are not necessarily drawn to scale.

FIG. 1 shows a system 3 for controlling the colour of the light output of a lamp 1. The lamp 1 can consist of a number of LEDs of different colours, for example an arrangement consisting of LEDs that output light in white, and other LEDs that emit light in blue, red and green, so that different colours and colour intensities can be produced by activating the appropriate LEDs. The lamp 1 of FIG. 1 could, for instance, be made to output a red light by activating the red LEDs and, optionally, a number of white LEDs. A yellowish light can be output by the lamp 1 by activating some red LEDs and some green LEDs, and, optionally, a number of white LEDs, since red and green light combine to give light of a yellow colour.

A user 5 holds a colour data collection device 2, with which he can control the colour of the light output by the lamp 1. The colour data collection device 2 is used to combine colours selected by the user 5 in order to give a desired target colour. For instance, the user 5 in FIG. 1 may wish to obtain a colour that is consists mainly of the blue colour $C_1$ of a flower 6, but with a touch of the green colour $C_2$ of a painting 7. The user 5 first aims the colour data collection device 2 at the first colour $C_1$, and activates the colour data collection device 2 by pressing an appropriate button, such as a copy button (for the sake of simplicity, the actions of the user and details of the realisation of the colour data collection device are not shown in the diagram). In order to ensure that only the desired colour $C_1$ is 'collected', the user 5 places the colour data collection device 2 firmly upon the item 6 of that colour $C_1$. The details of operation of the colour data collection device 2 will be explained in more depth below. Once the first colour $C_1$ has been 'collected' in this way, the user 5 places the colour data collection device 2 on the item of the second colour $C_2$. Again, by pressing an appropriate button, the user 5 activates the colour data collection device 2 to 'collect' the second colour $C_2$, which is mixed or combined with the first colour $C_1$ to give a target colour, in this case a blue-green between the blue $C_1$ of the flower 6 and the green $C_2$ of the painting 7. A description of this combined target colour is then transferred to a control unit 4 of the lamp 1, which can then output light in the target colour. In this way, the user 5 can 'fine-tune' the lamp 1 to output light in a desired shade so that objects in the surroundings are illuminated in a most satisfactory manner.

FIG. 2*a* shows a schematic diagram of a colour data collection device 2 in a longitudinal cross-section. The colour data collection device 2 is being firmly held onto the surface of an object with a colour $C_1$, $C_2$. The user, not shown in the diagram, can activate the colour data collection device 2 by means of a 'copy' button 25. The colour data collection device 2 of this embodiment is realised with a chamber 27, which is open at the top to allow light to enter, and in which are disposed a light source 28 and a colour detector 20. The geometry of the chamber 27 of the colour data collection device 2 ensures that effectively no light from outside can enter the chamber 27 of the colour data collection device 2 when it is held onto an object in the manner described. The light source 28, in this case a white LED 28, emits white light $L_w$, which is directed at the surface of the object. Depending on the colour and surface properties of the object, some wavelengths of light will be absorbed, and others will be reflected. Any reflected light $L_r$ from the object, i.e. light corresponding to the colour $C_1$, $C_2$ of the object, will impinge on the colour detector 20, which can be a charge-coupled device or an array of photodiodes or phototransistors that generate an electrical output directly related to the wavelength of the reflected light, i.e. to the colour $C_1$, $C_2$ of the object, and indicated in the diagram by the arrows leaving the colour detector 20. This electrical signal information is converted by a conversion unit 21 into a colour description $D_1$, $D_2$ in the form of an RGB value $D_1$, $D_2$ for the reflected light, i.e. the colour $C_1$, $C_2$ of the object upon which the colour data collection device 2 was placed. This first colour description $D_1$ can later be combined in a combining unit 22 with a second colour description $D_2$ to give a target colour description. Until that time, the first colour description $D_1$ is stored for future use in a memory 29 of the colour data collection device 2.

A representation of the colour $C_1$, $C_2$ 'collected' in the manner described above can be shown to the user by means of visual feedback in a visual presentation unit 24. In this embodiment, the visual presentation unit 24 consists of a number of coloured LEDs capable of rendering a collected colour, or a combined colour. In this embodiment, the intensity of the collected colour is slowly increased, and this gradual alteration is rendered visibly to the user, so that the user can release the copy button 25 when the shade and intensity of the collected colour shown in the visual presentation unit 24 has reached a satisfactory level. When collecting a first colour $C_1$, it is the first colour that is indicated to the user in the visual presentation unit 24, and, when collecting a second colour $C_2$ to mix with the first colour $C_1$, it is the combined colour that is rendered in the visual presentation unit 24. In this example, the combining unit 22 combines the first colour description $D_1$ with the second colour description $D_2$ by altering the individual R, G, and B values of the first colour description $D_1$ to approach the R, G, and B values of the second colour description $D_2$. This alteration can be linear, or can be chosen according to the relative differences between the R, G, and B values of the colour descriptions $D_1$, $D_2$.

By choosing the moment at which to release the copy button 25, the user can control the extent to which the second colour description $D_2$ is combined with the first colour description $D_1$. By only briefly pressing the copy button 25 while collecting the second colour $C_2$, the second colour $C_2$ will only slightly alter the collected first colour $C_1$. By keeping the copy button 25 pressed for longer, the second colour $C_2$ will have a correspondingly greater influence on the colour mix. The colour mix attained at the moment the user releases the button 25 is then the target colour description $D_T$. This target colour description $D_T$ can be stored in the memory 29 of the colour data collection device 2 for later transfer to a control unit of a lamp, or can be transferred directly by means of a transfer interface 23. Before transmitting the information to the lamp, the target colour description $D_T$ may be converted into a form suitable for the lamp, or any necessary conversion can be carried out in a control unit of the lamp.

FIG. 2*b* shows a alternative way of collecting a second colour with the aim of obtaining a target colour. Here, the user can simply tilt the colour data collection device 2 away from the first colour $C_1$, so that ambient or spurious light $L_{sp}$ can enter the open end of the chamber 27 of the colour data collection device 2. This spurious light $L_{sp}$, whose colour and intensity will depend on the environment in which the colour data collection device 2 is being used, will influence the already collected first colour description $D_1$. The readings taken from the colour detector 20 are converted in the conversion unit 21 to give a second colour description $D_2$, which is then gradually combined with the first colour description $D_1$ to give a combined colour description. This combined colour is shown to the user in the visual presentation unit 24. Again, the process of collecting the colour is controlled by the user, and the resulting target colour description $D_T$ can be transferred immediately to the control unit of the lamp, or can be stored in the memory 29 of the colour data collection device 2 for later transfer.

FIGS. 3*a*-3*c* schematically show the stages in obtaining a target colour description. Two 'colours' $C_1$, $C_2$ are shown as abstract shapes to represent any type of object or source of colour from which the colour data collection device 2 could collect a colour. In a first step, shown in FIG. 3*a*, the user, who holds the colour data collection device 2 but is not shown in the diagram, decides on the first colour $C_1$ that is to be collected. In the manner described above, the user activates the colour data collection device 2 so that a first colour description $D_1$ is obtained. In a second step, illustrated in FIG. 3*b*, colour data corresponding to a second colour $C_2$ is collected. The second colour $C_2$ can be a definite colour such as the colour of a physical object, and can be collected in the same way as the first colour $C_1$, or the second colour $C_2$ can simply originate from spurious light entering the colour data collection device 2 when this is tilted away from the first colour $C_1$. Colour data corresponding to the second colour $C_2$ is used to obtain a second colour description $D_2$, and these two colour descriptions $D_1$, $D_2$ are combined to give a target colour description $D_T$ which is transferred to a target lamp 1 in a third step, shown in FIG. 3*c*. A control unit 4 of the target lamp 1 applies the target colour description $D_T$ to the light source of the lamp 1—in this case an array of different colour LEDs—so that the lamp emits a light output in a colour corresponding to the combined colours $C_1$, $C_2$.

This procedure is also illustrated in the form of a block diagram in FIG. 4. Two colours $C_1$, $C_2$ are to be mixed. Using the method described above, colour data for these colours $C_1$, $C_2$ are collected by a photodiode array in a colour data collector 20. The colour data can be collected sequentially or simultaneously, as has already been described, and are converted in a conversion unit 21 to give RGB values $D_1$, $D_2$ for the colours $C_1$, $C_2$ respectively. These RGB colour descriptions $D_1$, $D_2$ are then combined in a combining unit 22 to give a resultant target colour description $D_T$ in the form of an RGB value describing the desired colour. This target colour description $D_T$ is then forwarded to a transfer interface 23, where it is converted into an appropriate signal for transmission to a control unit 4 of a lamp 1. The target lamp 1 avails of a receiver interface 26 which detects the incoming signal. The receiver interface 26 can convert the incoming signal into an appropriate form for use by a control unit 4 of the lamp, for instance it may convert the signal back into an RGB value, into separate control signals for a number of different coloured LEDs, or into control signals for a number of differently coloured moveable filters. The converted signal is then forwarded to the control unit 4 of the lamp. Using the signal, the control unit 4 drives the lamp 1 accordingly. The lamp 1 now emits light in a colour corresponding to the combination of the colours $C_1$, $C_2$ chosen by the user.

Although the present invention has been disclosed in the form of preferred embodiments and variations thereon, it will be understood that numerous additional modifications and variations could be made thereto without departing from the scope of the invention. For example, the colour data collection device could be equipped with a speech recognition interface in place of copy and paste buttons, so that a simple spoken command such as "Stop" could indicate the termination of a colour collection process, while a spoken command such as "Paste" could indicate that the colour is to be pasted or transferred to a lamp. Other commands such as "More" or "Less" could conceivably be used to control the colour mixing process. Furthermore, colour data collection by the colour data collection device can be performed in any suitable way, for example with the aid of a laser source, for example, in the chamber of the colour data collection device. Reflected laser light, collected by the colour data collection device, then yields colour data for the colour at which the device was aimed. Preferably, a modulated laser, for example, modulated with 1 kHz, may be used in order to better distinguish its light from ambient light or sunlight.

For the sake of clarity, it is to be understood that the use of "a" or "an" throughout this application does not exclude a plurality, and "comprising" does not exclude other steps or elements. A "unit" or "module" can comprises a number of units or modules, unless otherwise stated.

The invention claimed is:

1. A method of controlling the colour of the light output of a lamp, the method comprising:

electronically collecting colour data pertaining to a first colour ($C_1$) to obtain a first colour description ($D_1$);

electronically collecting colour data pertaining to a second colour ($C_2$) to obtain a second colour description ($D_2$);

combining the first colour description ($D_1$) with the second colour description ($D_2$) to obtain a target colour description ($D_T$);

transferring the target colour description ($D_T$) to a control unit of the lamp; and driving the lamp according to the target colour description ($D_T$) to give a target colour light output.

2. A method according to claim 1, wherein the step of combining the first colour description ($D_1$) with the second colour description ($D_2$) to obtain a target colour description ($D_T$) comprises gradually altering the first colour description ($D_1$) to approach the second colour description ($D_2$).

3. A method according to claim 1, wherein the step of obtaining a colour description pertaining to a colour ($C_1$,$C_2$) comprises directing a colour data collection device at the colour ($C_1$,$C_2$), capturing light ($L_r$) originating from that colour ($C_1$,$C_2$) with the colour data collection device, electronically converting the captured light ($L_r$) into colour data, and translating the colour data into a colour description.

4. A method according to claim 3, wherein the step of obtaining a colour description ($D_1$, $D_2$) pertaining to a colour ($C_1$,$C_2$) comprises:

placing the colour data collection device upon an object of the colour (C1,C2), directing light (Lw) from a light source within the colour data collection device at the colour (C1,C2), capturing light (Lr) reflected from that colour (C1,C2) with the colour data collection device, electronically converting the reflected light (Lr) into colour data, and translating the colour data into a colour description.

5. A method according to claim 4, wherein the colour description ($D_1$) pertaining to a first colour ($C_1$) and the colour description ($D_2$) pertaining to a second colour ($C_2$) are obtained sequentially.

6. A method according to claim 4, wherein a colour description ($D_1$) pertaining to a first colour ($C_1$) and a colour description ($D_2$) pertaining to a second colour ($C_2$) are obtained simultaneously.

7. A method according to claim 4, wherein the step of obtaining a colour description ($D_2$) pertaining to the second colour ($C_2$) comprises tilting the colour data collection device away from the first colour ($C_1$) and permitting spurious light ($L_{sp}$) to enter the colour data collection device.

8. A method according to claim 1, wherein a colour description ($D_1$, $D_2$, $D_T$) is visually presented to a user of the colour data collection device.

9. A method according to claim 1, wherein collection of colour data is controlled by the user according to the visual presentation of a colour corresponding to a colour description ($D_1$, $D_2$, $D_T$).

10. A method according to claim 1, wherein the step of combining the second colour description ($D_2$) with the first colour description ($D_1$) to give the target colour description is terminated by the user (5) according to the visual presentation of the colour corresponding to the first colour description ($D_1$) combined with the second colour description ($D_2$).

11. A system for controlling the colour of the light output of a lamp, the system comprising:

a colour data collection device for collecting colour data pertaining to a first colour ($C_1$) to obtain a first colour description ($D_1$), and for collecting colour data pertaining to a second colour ($C_2$) to obtain a second colour description ($D_2$);

a combining unit (22) for combining the first colour description ($D_1$) with the second colour description ($D_2$) to obtain a target colour description ($D_T$); and a control unit for driving the lamp according to the target colour description ($D_T$).

12. A colour data collection device for use in a system for controlling the colour of the light output of a lamp, the device comprising:

a colour detector for electronically converting captured light ($L_r$, $L_{sp}$) into colour data pertaining to a colour ($C_1$, $C_2$);

a conversion unit for translating the colour data pertaining to a colour ($C_1$, $C_2$) into a corresponding colour description ($D_1$, $D_2$);

a combining unit for combining a first colour description ($D_1$) with a second colour description ($D_2$) to obtain a target colour description ($D_T$); and a transfer interface for transferring the target colour description ($D_T$) to a control unit of the lamp.

13. A colour data collection device according to claim 12, comprising a visual presentation unit for visually presenting a colour description ($D_1$, $D_2$, $D_T$).

* * * * *